United States Patent [19]

Hunter et al.

[11] Patent Number: 5,601,763
[45] Date of Patent: *Feb. 11, 1997

[54] IN SITU PIPELINE REHABILITATION SYSTEM

[76] Inventors: Robert M. Hunter; Frank M. Stewart; William H. Hunter, all of 320 S. Wilson Ave., Bozeman, Mont. 59715

[*] Notice: The term of this patent shall not extend beyond the expiration date of Pat. No. 5,104,595.

[21] Appl. No.: 345,996

[22] Filed: Nov. 29, 1994

[51] Int. Cl.⁶ .......................... B29C 47/06; B29C 63/34
[52] U.S. Cl. .................. 264/36; 138/97; 156/287; 264/514; 264/564; 264/573; 264/209.2; 264/209.3; 264/269; 264/DIG. 65; 425/13; 425/326.1; 425/380; 425/DIG. 39
[58] Field of Search ................. 264/33, 35, 36, 264/514, 516, 564, 573, 269, 209.2, 209.3, DIG. 65; 425/62, 13, 262, 380, 326.1, 376.1, DIG. 39; 118/DIG. 10; 138/97, 98, 145; 156/94, 287, 294

[56] References Cited

U.S. PATENT DOCUMENTS

| | | | |
|---|---|---|---|
| 2,632,205 | 3/1953 | Harris . | |
| 3,122,786 | 3/1964 | Huisman | 425/262 |
| 3,230,722 | 1/1966 | Coulter et al. | 425/380 |
| 3,376,181 | 4/1968 | Larson | 156/203 |
| 3,560,295 | 2/1971 | Kimbrell et al. | 156/294 |
| 3,720,557 | 3/1973 | Longoni et al. | 156/256 |
| 4,072,453 | 2/1978 | Oltmanns et al. | 425/62 |
| 4,207,130 | 6/1980 | Barber | 156/244 |
| 4,233,101 | 11/1980 | Scragg et al. | 156/287 |
| 4,308,824 | 1/1982 | Muta et al. | 118/713 |
| 4,371,569 | 2/1983 | Muta et al. | 427/230 |
| 4,386,628 | 6/1983 | Stanley . | |
| 4,419,163 | 12/1983 | Yamamoto et al. | 156/94 |
| 4,496,499 | 1/1985 | Brittain et al. | 264/36 |
| 4,640,313 | 2/1987 | Stanley | 138/141 |
| 4,773,450 | 9/1988 | Stanley | 138/98 |
| 4,777,984 | 10/1988 | Storah | 138/98 |
| 4,867,921 | 9/1989 | Steketee | 264/36 |
| 4,925,381 | 5/1990 | Aoki et al. | 425/145 |
| 5,104,595 | 4/1992 | Hunter | 264/33 |

OTHER PUBLICATIONS

Hunter, R. M. and Stephens, J. E. System for In Situ Pipeline Rehabilitation, Jul. 1990 pp. 9–13.

Hunter, R. M., Stewart, F. M. & Stephens, J. E. System for Situ in Pipeline Rehabilitation, Oct. 1994, vol. I & II. (This is not prior art because it was not released to the public until after the subject application was filed. It does, however, list prior art.).

Primary Examiner—Mathieu D. Vargot

[57] ABSTRACT

Underground pipelines that carry wastewater, water, natural gas, and industrial fluids deteriorate with age. This invention is a process and apparatus for installing a thermoplastic liner in a dry pipeline to accomplish in situ rehabilitation. It involves extruding a tube of thermoplastic liner material within the interior of a dried and preheated pipeline in situ, said tube having an outside diameter smaller than the inside diameter of said pipeline. The tube is next expanded so that the outside diameter of said tube is substantially equal to the inside diameter of said pipeline. The expanded tube is then cooled and hardened in a liner configuration.

19 Claims, 2 Drawing Sheets

IN SITU PIPELINE REHABILITATION SYSTEM

This invention was made with Government support under Small Business Innovation Research Grant No. ISI-9022356 awarded by the National Science Foundation. The Government has certain rights in the invention.

BACKGROUND OF THE INVENTION

The background of the invention is set forth in two parts: the field of the invention and the description of related art.

1. Field of the Invention

This invention relates to in situ rehabilitation of pipelines. In particular, it relates to installing a thermoplastic liner in existing pipelines.

2. Description of Related Art

The invention disclosed herein provides improvements to the inventions disclosed in U.S. Pat. No. 5,104,595 by Hunter, Apr. 14, 1992, entitled "Process and Apparatus for In Situ Rehabilitation of Pipelines." The disclosure of that patent is incorporated by reference wherein as if fully set forth.

A limitation of prior art systems is the presence of weld lines in the extruded liner that reduce its melt strength. Another limitation is excessive and uneven shrinkage of the installed liner.

Other background material is provided in a report by Yellowstone Environmental Science, Inc., of 320 S. Willson Ave., Bozeman, Mont. 59715, entitled System for In Situ Rehabilitation of Pipelines Phase II Final Report, Volumes I and II, October 1994. That material is incorporated by reference herein as if fully set forth.

SUMMARY OF THE INVENTION

The present invention provides a system for in situ rehabilitation of pipelines. It involves extruding a hollow tube of thermoplastic liner material within and into the interior of an existing, installed, heated pipeline. At least the interior surface of the pipeline may be preheated before the lining operation begins. Alternatively, preheating of at least the interior surface of the pipeline may occur immediately before the liner is installed. Because pipelines in need of rehabilitation have often lost their original circular cross sectional shape and/or have joints that ape misaligned, the extruded tube has a cross-sectional area and/or diameter less than that of the pipeline. Thus, the hot, relatively soft tube is initially smaller than the pipeline. After the tube is extruded, it is expanded so that its outer surface is configured to fit against the heated, inner surface of the pipeline. In a preferred embodiment, no adhesive is applied to either the inside surface of the pipeline or the outside surface of the tube. The expansion may be accomplished by the normal diameter swell which occurs subsequent to extrusion of thermoplastic materials and/or it may be accomplished by introducing a relatively cool, pressurized fluid, such as air or water, into the interior of the hollow tube. In the instaince of pressurized fluid introduction, the pressure exerted by the pressurized fluid acts on the inner surface of the tube to cause expansion (essentially blow molding) of the relatively soft tube material. Upon contact of the outer surface of the tube with the heated, but relatively cooler, inner surface of the pipeline, cooling and hardening of the liner occurs. The pressurized fluid being relatively cooler than the tube, may also act to cool and harden the liner.

In a broad sense, the invention is a process for in situ lining of a pipeline having an interior surface comprising the steps of:

heating at least said interior surface, extruding a tube of thermoplastic liner material within the interior of said pipeline, said tube being generally circular in cross section and said tube having an outside diameter smaller than the inner diameter of said pipeline and expanding said tube so that the outer diameter of said tube is substantially equal to the inner diameter of said pipeline.

In a broad sense, the best mode of the process comprises the steps of:

heating at least the interior surface of a pipeline in situ to a temperature in the range of 90° C. to 130° C.

melting and pressurizing a thermoplastic to produce a pressurized melt, conveying the melt to a point of extrusion in said pipeline, at said point of extrusion providing a movable extrusion die, moving said movable extrusion die in the in situ pipeline and simultaneously extruding a hot, tubular liner with an initial outside diameter less than the inside diameter of the pipeline into the interior of the pipeline, expanding said hot tubular liner such that the final outside diameter of the liner is approximately equal (±about 10 percent) to the inside diameter of the pipeline, and cooling the tubular liner.

It may be necessary to prepare an existing pipeline for rehabilitation by lining. Preparation activities may include cleaning with a highly pressurized water jet, root removal, filling of large cracks with grout and/or replacement of pipe segments that have collapsed to such a degree that lining is impractical.

The pipeline is preferably prepared for lining by removing substantially all liquid water from the interior of the pipeline. Thus, in a preferred embodiment, any standing water is removed from the interior of the pipeline by pulling a pig through the pipeline.

The liner material is an integral part of the liner system. While a variety of potential liner materials can be extruded, the preferred mode of this invention involves the use of thermoplastics. Thermoplastics melt on heating, solidify on cooling and may undergo these changes repeatedly. They may be differentiated from the other class of plastics, thermosets, in that thermosets are chemically reactive in their fluid condition and harden by further reaction. Subsequent heating may soften the structure of thermosets somewhat, but cannot restore their ability to flow. Thermoplastics exhibit relatively high strength and much greater elongation before breaking than thermosets. A number of thermoplastics are relatively low in cost. As cost is a primary criteria for selecting a liner material, "commodity" or recycled plastics are the preferred liner material for the present invention. Thermoplastics appropriate for in situ pipeline rehabilitation using the present invention include polyvinyl chloride (PVC), acrylonitrile-butadiene-styrene (ABS), high density polyethylene (HDPE), and polypropylene (PP). HDPE and PP are favored because they are relatively heat stable (i.e., their mechanical properties do not significantly degrade during extended, high temperature processing) and because their viscosities at typical processing temperatures are relatively low.

Liner initiation and termination require special attention, in that the shape and quality of an extruded liner produced at these times is difficult to control. Furthermore, the embodiments of the invention that involve pressurizing the interior of the liner tube, liner initiation means, and/or liner termination means may also serve as bulkheads at the ends of the tube to prevent escape of the pressurized fluid at those locations.

The preferred liner initiation means is a hardened piece of the same thermoplastic material as the liner having a diameter slightly less (up to 10 percent) than the pipeline inside diameter. The piece of thermoplastic may take the form of a short, hollow pipe having a disk across one end, or it may take the shape of a disk or cap having an outer diameter slightly less than the inner diameter of the pipeline. During liner initiation, the tube of liner material welds to the liner initiation means. The liner initiation means is cut out of the pipe after the liner has hardened.

In one embodiment, liner termination is achieved by halting the movement and heating of the movable extrusion die and allowing the melt to harden. In this case, a cooling extrusion die serves as the liner termination means. In an alternative embodiment, the terminal end of the liner tube is sealed by folding or collapsing the tube on itself or by allowing the end of the tube to weld to a piece of the same thermoplastic. At least the portion of the liner termination means that would impede flow through the pipeline is removed prior to reactivation of the pipeline.

The liner material is melted and pressurized by an extruder/molten polymer pump. In one embodiment, a single- or multiple-screw extruder is used to melt and mix the polymer. A gear pump may be provided downstream from the extruder to increase the pressure of the melt or to stabilize the melt flow rate. The extruder may befitted with a heated hopper to preheat the thermoplastic.

Plastic is conveyed to the point of liner profile extrusion either in a molten state or in a solid state. While pneumatic conveyance of pelletized plastic beads is feasible, the best mode calls for conveying polymer from the extruder to the movable die head in the molten state through a flexible, heated hose.

The entire thickness of the pipeline may be heated or, preferably, just the interior surface of the pipeline is heated. Heating may be accomplished by injection of a hot fluid, such as steam, oil, or water (below 100° C.) into the interior of the pipeline. In an alternative, preferred embodiment the interior surface of the pipeline is heated by means of the same heating element(s) used to heat the heated hose. Alternatively, an electrical flash heater located adjacent to or on the die is used to rapidly raise the temperature of the interior of the pipe to an appropriate level.

In the best mode, the movable extrusion die has an outside diameter of less than about 90 percent of the pipeline inside diameter so that it can pass through pipes that are out of round. There are three basic types of dies capable of producing a seamless, annular cross section in this application. They are the center-fed mandrel support die, the screen pack die, and the spiral-mandrel die. In a preferred embodiment, a spiral mandrel die is used.

In the spiral mandrel die, the melt is first divided into several separate streams. The melt is thus distributed into spiral-shaped channels that are machined into the mandrel. In the direction of melt flow, the depth of the channels decreases and the gap between the mandrel and the outer part of the die increases. Spiral mandrel die systems are advantageous in that flow marks are avoided. Furthermore, relatively low pressure drops throughout the die are possible.

A die positioning system is used to position the movable extrusion die longitudinally and transversely in the pipeline. Longitudinally, the positioning system moves the die through the pipeline at a relatively constant rate as the liner tube is extruded. Transversely, the system keeps the die centrally located in the pipeline cross-section. In the preferred embodiment, skids constructed of spring steel are used to position the die transversely, and either cables (e.g., steel braided wire) or the heated hose and one or two precision winches are used to position the die longitudinally.

Means are also provided to expand the liner tube and, in some embodiments, to cool it. In the preferred embodiment, pressurized air, (STET) introduced to the interior of the liner tube through the body of the movable extrusion die, is the primary means used to expand the liner. Cooling occurs by conduction of heat into the wall of the pipeline.

The present invention overcomes the limitations of prior art lining methods and devices by providing an inexpensive, rapidly installed and relatively ductile liner that does not significantly reduce the inside diameter of the lined pipeline. It is an object of the present invention to reduce the cost of rehabilitating relatively dry underground pipelines. It is a further object to reduce the time such pipelines must be kept out of service in order to rehabilitate them. It is another object to provide a relatively ductile liner that would be capable of a significant amount of plastic deformation under tension prior to breaking should the lined pipeline shift or shear. Another object is to provide a means for heating the interior surface of a pipeline, for extruding a liner within the pipeline, and for expanding it to substantially fit against the inside surface of the pipeline. Another object is to allow lining to the end of in situ pipelines. Further objects and advantages of the invention will become apparent from a consideration of the drawings and the ensuing description of it.

Figure 1:
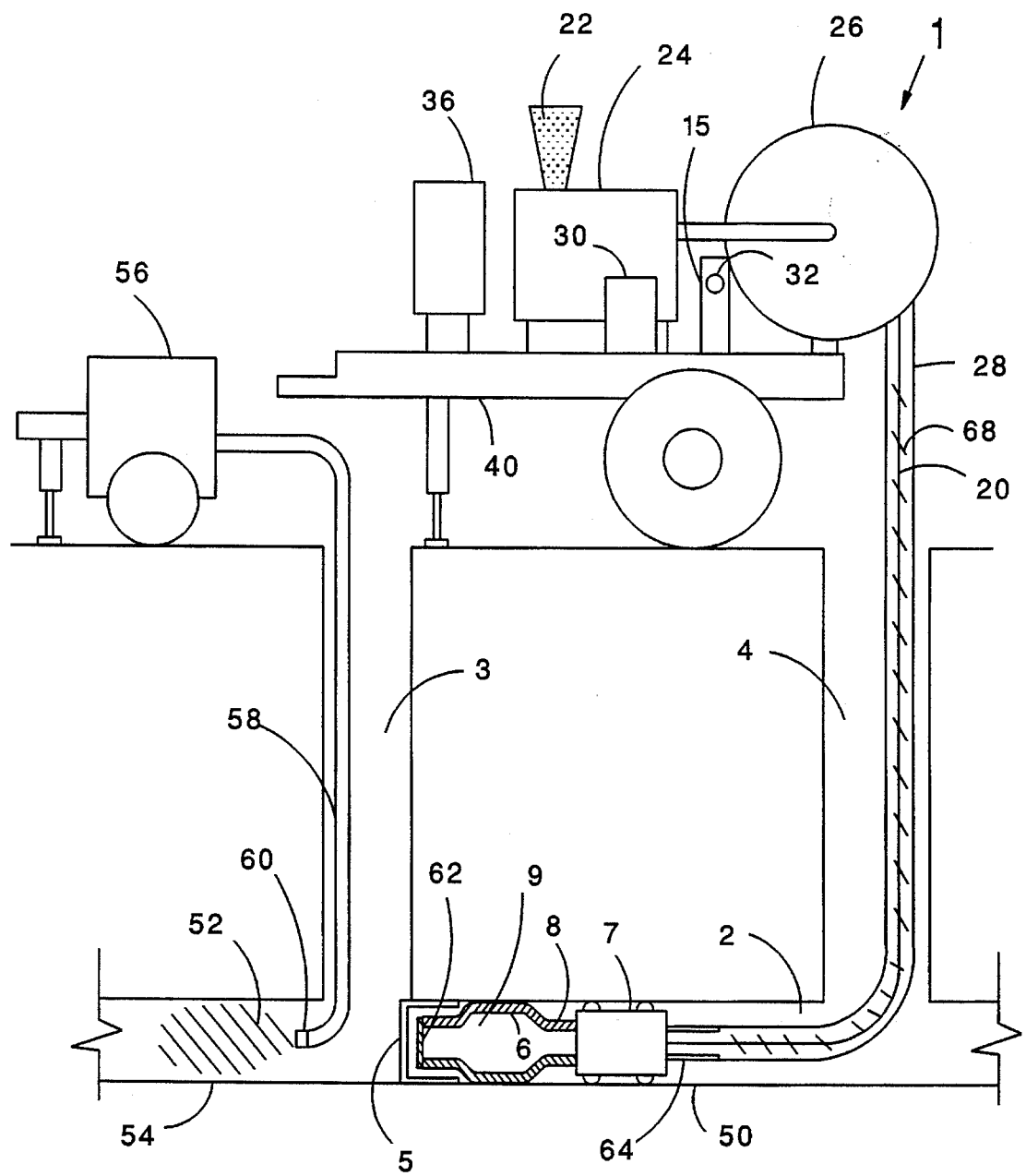
FIG. 1 is a schematic drawing of the system installing a liner in a pipeline.

The following reference numerals are used to indicate the parts of the invention on the drawings:

1 apparatus
2 pipeline
3 first manhole
4 first manhole
5 cap
6 liner
7 movable extrusion die, die, movable die
8 tube
9 plenum
15 compressor
20 tubing
22 liner material, thermoplastic liner material
24 extruder
26 winch
28 hose, heated hose
30 power source
32 gauge
36 motor
40 trailer
50 segment, pipe segment
52 steam
53 mandrel 54 pipe segment
55 tube
56 boiler
57 first passageway
58 hose
60 nozzle
62 disk
63 second passsageway
64 flash heater
65 barrel
66 extruding end
67 band heater
68 heater element
69 ring
70 outer surface
72 flange
82 conduits
84 channels
90 cavity

DESCRIPTION OF THE PREFERRED EMBODIMENTS

Referring to FIG. 1, apparatus 1 is being used to rehabilitate segment 50 of pipeline 2 between first manhole 3 and second manhole 4. In one embodiment, segment 50 is heated prior to liner installation by injecting steam 52 into the interior of the pipeline segment. In FIG. 1, steam 52 is injected into next segment to be lined 54 by means of boiler 56, hose 58, and nozzle 60. Cap 5, containing disk 62, is secured in pipeline 2 at first manhole 3 which is the point of initiation of liner 6. Movable extrusion die 7 extrudes tube 8 of liner material that welds to disk 62 forming plenum 9. Plenum 9 is pressurized with air to a pressure of 0.1 to 10 pounds per square inch gauge (with reference to atmospheric pressure.) The air is pressurized by compressor 15 and delivered via tubing 20 and through die 7 into plenum 9.

In an alternative embodiment, the interior of segment 50 is heated immediately prior to liner installation by means of flash heater 64 located adjacent to movable die 7. Preferably, segment 50 is preheated by means of heater element 68 on the exterior of heated hose 28. At least the interior of pipe segment 50 is heated to a temperature in the range of 90° C. to 130° C. In the instance of steel pipe, the interior surface of the pipe is heated to 120° C. plus or minus 5° C.

Liner material 22 is melted and pressurized by extruder 24 and pumped through the body of winch 26 into heated hose 28. Electricity for heated hose 28 and element 68 is provided by power source 30. Winch 26 is used to position movable die 7 longitudinally in pipeline 2 by taking up (retracting) heated hose 28 at a relatively constant rate. Die 7 may be centered in pipeline 2 by skids (not shown). The rate of movement of die 7 may be varied in response to changes in the pressure in plenum 9 sensed by gauge 32.

Motive power is supplied to extruder 24 by motor 36 which may be an electric motor or an internal combustion engine. In an alternative embodiment, motor 36 is used to pressurize hydraulic fluid which is, in turn, used to drive hydraulic motors attached to extruder 24, winch 26, and compressor 15. System components may be transported to the site of liner installation on trailer 40.

Figure 3:
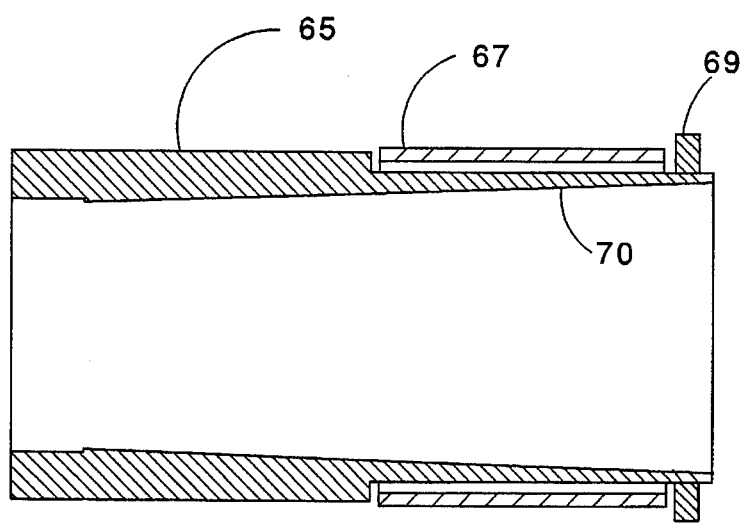
FIG. 3 shows the barrel component of the moveable extrusion die in cross section.
Figure 2:
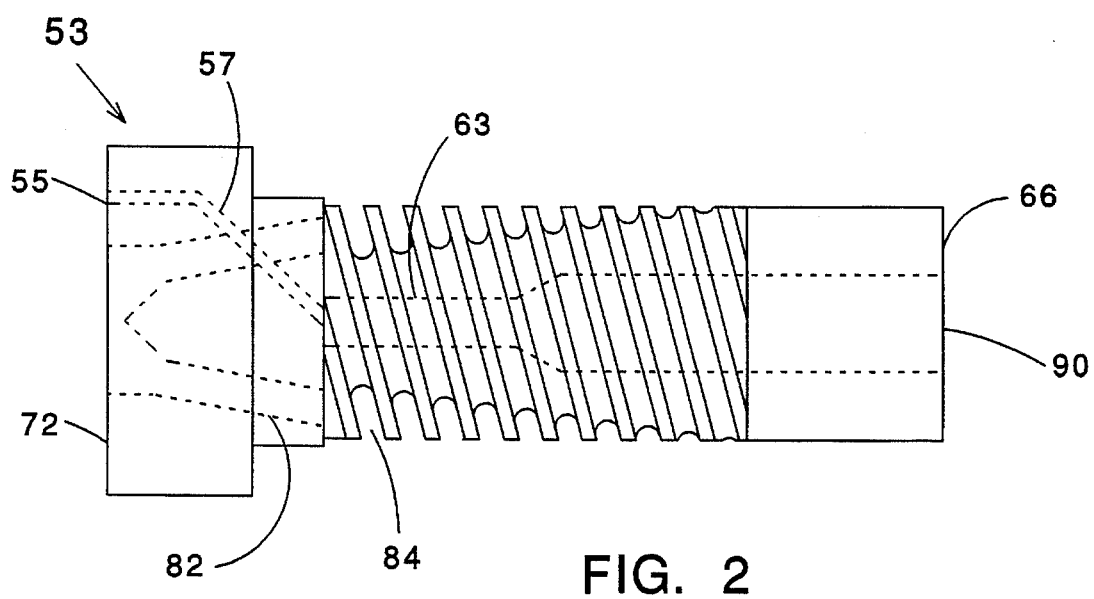
FIG. 2 shows the mandrel component of the movable extrusion die in cross section.

Referring to FIG. 1, FIG. 2, and FIG. 3, die 7 comprises mandrel 53 and barrel 65. Barrel 65 and mandrel 53 comprise the outer and inner sections, respectively, of the die. Barrel 65 is attached to mandrel 53 with bolts (not shown). Die 7 connects to a flange (not shown) welded to the end of heated hose 28 by means of flange 72 on mandrel 53. Pressurized air enters mandrel 53 via tube 55 and travels through mandrel 53 in first passageway 57. Passageway 57 serves to convey the pressurized air to second passageway 63 and hence out of the extruding end 66 of movable extrusion die 7. Band heater 67 is secured to the outer surface 70 of barrel 65 by ring 69.

Thermoplastic melt is introduced to movable extrusion die 7 by heated hose 28. The melt flows through conduits 82 into channels 84. Movement through die 7 transforms the melt stream into a tube 8 of molten thermoplastic. As tube 8 leaves die 7, its diameter and thickness are increased somewhat by die swell. The pressurized air introduced to the plenum 9 inside tube 8 expands tube 8 to form liner 6, the outside surface of which is configured to fit against the inside surface of pipeline 2.

Prior to operating apparatus 1 in pipeline 2, pipeline 2 is cleaned using conventional means, dried, and heated. To operate apparatus 1, extruder 24, winch 26, heated hose 28, and die 7 are heated to about 250° C. Cap 5 is secured at the point on pipeline 2 at which liner initiation is to occur. Die 7 is positioned in pipeline 2 in cap 5 using heated hose 28 as a longitudinal positioning means. Extruder 24 is then used to melt and pressurize thermoplastic liner material 22 which then flows through winch 26, heated hose 28, and die 7. When tube 8 is initially extruded, it welds to disk 62. Movable extrusion die 7 is then moved away from cap 5, and air is introduced to plenum 9 at a rate that causes tube 8 to expand and its outer surface to fit against the inner surface of pipeline 2. Liner 6 cools and hardens as its heat is conducted into pipeline 2.

When pipeline 2 is completely lined, die 7 enters manhole 4. At this point, liner 6 is terminated by allowing die 7 to cool. Alternatively, the terminal end of the liner 6 may be allowed to weld to a second pipe segment (not shown). In the preferred embodiment, during the subsequent cooling and hardening of liner 6, a constant air pressure is maintained in plenum 9. After liner 6 has hardened, excess liner material (not shown) located at the points of liner initiation and termination that would interfere with flow in pipeline 2 is removed by cutting, reaming, or boring.

In an alternative embodiment, a sensor (not shown) such as a video camera or caliper is provided in cavity 90 to allow monitoring of the interior of liner 6 as it is extruded and as it hardens. In another embodiment, the integrity of plenum 9 is monitored by monitoring the pressure in plenum 9 or the rate at which air is introduced into plenum 9.

In yet another embodiment, heating of die 7 is discontinued after lining is started. The thickness of liner 6 may also be controlled by monitoring and varying the ratio of the speed of die 7 movement to the rate of extrusion of tube 8. The drag on die 7 may be reduced by wrapping heated hose 28 with wire (e.g. bronze wire). The drag on die 7 as it moves through pipeline 2 may be monitored by measuring the current flowing into the hose reel motor.

Many variations of the invention will occur to those skilled in the art. All such variations within the scope of the claims are intended to be within the scope and spirit of the invention.

We claim:

1. A process for in situ lining of a pipeline having an interior, said interior having an interior surface, comprising the steps of heating at least the interior surface to a temperature in the range 90° C. to 130° C., extruding a tube of thermoplastic liner material within the interior of said pipeline through a movable extrusion die, said tube being generally circular in cross section and said tube having an outside diameter smaller than the inside diameter of said pipeline, and expanding said tube so that the outside diameter of said tube is substantially equal to the inside diameter of said pipeline, wherein said interior surface is heated immediately prior to liner installation by means of a flash heater located adjacent to said movable extrusion die.

2. The process of claim 1 wherein said interior surface is heated to a temperature of 120° C. plus or minus 5° C.

3. A process for rehabilitating a pipe in situ comprising the step of heating at least the interior surface of a pipeline in situ to a temperature in the range of 90° C. to 130° C. immediately prior to liner installation by means of a flash heater located adjacent to a movable extrusion die, extruding a tube of thermoplastic liner material within said pipe, the cross-sectional outside dimensions of said tube being less than the cross-sectional inside dimensions of said pipe at the time of extrusion of said tube, increasing the cross-sectional outside dimensions of said tube so that said outside dimensions are essentially equal to the cross-sectional inside dimensions of said pipe, and cooling and hardening said tube in a liner configuration.

4. A process of claim 3 wherein an extrusion die is the means for extruding said tube, and expanding the tube of thermoplastic liner material is accomplished by delivering a compressed fluid to the interior of said tube through said extrusion die.

5. The process of claim 3 wherein standing water is removed from that portion of the interior surface of said pipeline that is being lined.

6. The process of claim 3 further comprising cleaning the interior of the pipe to remove debris prior to extruding a thermoplastic, tubular liner within and into the interior of said pipe.

7. The process of claim 5 wherein the thermoplastic liner material is selected from the group consisting of:

high density polyethylene, polypropylene, and acrylonitrile-butadiene-styrene.

8. The process of claim 5 wherein the compressed fluid is air.

9. A system for installing a thermoplastic liner in an existing pipe in situ, said pipe having an interior surface, said system comprising means for flash heating said interior surface to a temperature in the range of 90° C. to 130° C., means for melting and pumping a thermoplastic, means for forming a thermoplastic liner tube within said pipe, said tube having an outside diameter less than the inside diameter of said pipe, flexible means for delivering said molten thermoplastic from said melting and pumping means to said liner forming means, means for expanding said liner to be in contact with the interior of said pipe while said liner tube is hot and soft, and means for cooling and hardening said liner.

10. The system of claim 9 wherein said means for melting and pumping is a single-screw extruder.

11. The system of claim 9 wherein said means for forming a thermoplastic tubular liner is a movable extrusion die.

12. The system of claim 9 wherein said flexible means for delivering is a flexible, high pressure tube capable of withstanding pressures up to 4,000 pounds per square inch gauge and temperature up to 300° C.

13. The system of claim 9 wherein said means for expanding comprises means for supplying compressed air.

14. The system of claim 9 wherein said means for cooling comprises means for supplying compressed air.

15. A system for installing in situ a thermoplastic liner in a pipe having an interior surface, said system comprising means for pumping whereby a liner material is pressurized, means for flash heating said interior surface to a temperature in the range of 90° C. to 130° C. prior to extrusion of said liner material, a movable extrusion die for extruding said liner material in an initial tubular shape, said initial tubular shape having an outside cross-sectional shape with an area less than the inside cross-sectional area of said pipe, flexible means for conveying said liner material from said means for pumping to said extrusion die, means for positioning said movable extrusion die in said pipe, means for initiating installation of said liner attachable to the beginning of said liner, means for terminating installation of said liner connected to the end of said liner, and means for expanding said liner from said initial tubular shape to substantially configure said liner to fit the inside cross-sectional shape of said pipe.

16. A process for lining a stationary pipeline, said pipeline having an interior, said interior having an interior surface, said process comprising the steps of:

drying said interior surface, preheating said interior surface to a temperature in the range 90° C. to 130° C. immediately prior to liner installation by means of a flash heater located adjacent to a movable extrusion die, melting and pressurizing a thermoplastic to produce a pressurized melt, conveying the melt in a flexible hose to said movable extrusion die in said stationary pipeline in situ, moving said movable extrusion die in the stationary pipeline and simultaneously extruding a hot, tubular liner material with an initial outside diameter less than the inside diameter of the pipeline into the interior of the pipeline, concurrent with said extruding, expanding said hot tubular liner by delivering a compressed fluid to the interior of the liner through the movable extrusion die such that the diameter of the liner is enlarged until it conforms approximately to the inside surface of the pipeline, and allowing the tubular liner to cool.

17. The process of claim 16 wherein drying said interior surface comprises removing standing water from within said interior.

18. The process of claim 17 wherein removing standing water comprises pulling a pipe through said pipeline.

19. A system for installing a liner of thermoplastic liner material in a pipe in situ, said pipe having an interior surface, said system comprising means for drying said interior surface, means for flash preheating said interior surface to a temperature in the range 90° C. to 130° C.

means for melting and pumping a thermoplastic material whereby said liner material is pressurized, a movable extrusion die movable along a pipe in situ for extruding said liner material in an initial tubular shape as said die is moved along said pipe, means for moving said movable extrusion die, flexible means for conveying said liner material from said means for melting and conveying thermoplastic material to said extrusion die, means for spacing said movable extrusion die from the interior of said pipe, and means for expanding said liner from said initial tubular shape to substantially configure said liner to fit the inside cross-sectional shape of said pipe, wherein the means for expanding said liner comprises an air tube through the movable extrusion die.

* * * * *